(12) United States Patent
Park et al.

(10) Patent No.: US 9,796,290 B2
(45) Date of Patent: Oct. 24, 2017

(54) METHOD AND APPARATUS OF CONTROLLING OUTPUT VOLTAGE OF DC CONVERTER FOR VEHICLE INCLUDING DRIVING MOTOR

(71) Applicants: Hyundai Motor Company, Seoul (KR); Kia Motors Corporation, Seoul (KR)

(72) Inventors: Jun Yeon Park, Gyeonggi-do (KR); Dong Jun Shin, Gyeonggi-do (KR); Sounghan Noh, Gyeonggi-do (KR); Hojoong Lee, Gyeonggi-do (KR); Dong Pil Yoon, Incheon (KR); Chang Ryeol Yoo, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 14/938,886

(22) Filed: Nov. 12, 2015

(65) Prior Publication Data

US 2017/0021737 A1    Jan. 26, 2017

(30) Foreign Application Priority Data

Jul. 21, 2015   (KR) ........................ 10-2015-0103218

(51) Int. Cl.
*B60L 11/18*   (2006.01)

(52) U.S. Cl.
CPC ....... *B60L 11/1861* (2013.01); *B60L 11/1805* (2013.01); *B60L 11/1811* (2013.01); *B60L 11/1848* (2013.01)

(58) Field of Classification Search
CPC .............. B60L 11/1861; B60L 11/1805; B60L 11/1848; B60L 11/1811
USPC ......................................................... 320/134
See application file for complete search history.

(56) References Cited

U.S. PATENT DOCUMENTS

| | | | |
|---|---|---|---|
| 7,796,410 B2 * | 9/2010 | Takayanagi et al. . | H02J 7/0013 307/66 |
| 8,478,469 B2 * | 7/2013 | Ueo et al. ............... | B60L 3/003 701/22 |
| 8,860,363 B2 * | 10/2014 | Ang .................... | B60L 11/1816 320/104 |
| 8,928,272 B2 * | 1/2015 | Song ........................ | B60L 1/14 320/104 |
| 8,952,564 B2 * | 2/2015 | Kamichi et al. ........ | B60L 3/003 307/10.1 |

(Continued)

FOREIGN PATENT DOCUMENTS

| | | |
|---|---|---|
| JP | 2013-095246 A | 5/2013 |
| KR | 10-0867795 B1 | 11/2008 |

(Continued)

*Primary Examiner* — Sun Lin
(74) *Attorney, Agent, or Firm* — Mintz Levin Cohn Ferris Glovsky and Popeo, P.C.; Peter F. Corless

(57) ABSTRACT

A method and an apparatus are provided for controlling an output voltage of a direct current (DC) converter for a vehicle including a driving motor. The apparatus of controlling an output voltage of a DC converter for a vehicle including a driving motor includes a data detector that is configured to detect data for adjusting the output voltage of the DC converter and a controller that is configured to adjust the output voltage of the DC converter based on the detected data.

19 Claims, 7 Drawing Sheets

(56) References Cited

U.S. PATENT DOCUMENTS

| | | | | |
|---|---|---|---|---|
| 2014/0217812 A1* | 8/2014 | Sugiyama et al. | .... | H02J 7/0054 |
| | | | | 307/9.1 |
| 2016/0193940 A1* | 7/2016 | Tashiro et al. | ...... | B60L 11/1861 |
| | | | | 701/22 |
| 2017/0008408 A1* | 1/2017 | Park et al. | .......... | B60L 11/1814 |

FOREIGN PATENT DOCUMENTS

| | | |
|---|---|---|
| KR | 10-1180801 B1 | 9/2012 |
| KR | 10-2015-0071928 A | 6/2015 |

* cited by examiner

METHOD AND APPARATUS OF CONTROLLING OUTPUT VOLTAGE OF DC CONVERTER FOR VEHICLE INCLUDING DRIVING MOTOR

CROSS-REFERENCE TO RELATED APPLICATION

This application claims priority to and the benefit of Korean Patent Application No. 10-2015-0103218 filed in the Korean Intellectual Property Office on Jul. 21, 2015, the entire contents of which are incorporated herein by reference.

BACKGROUND (a) Field of the Invention

The present invention relates to a method and an apparatus of controlling an output voltage of a direct current (DC) converter for a vehicle that has a driving motor.

(b) Description of the Related Art

Generally, a hybrid electric vehicle (HEV), a plug-in hybrid electric vehicle (PHEV), an electric vehicle, and a fuel cell electric vehicle (FCEV) commonly called an environmental-friendly vehicles are driven by a driving motor that obtains a torque by electrical energy. Particularly, the hybrid electric vehicle efficiently combines and uses power of an internal combustion engine and power of the driving motor.

The environmental-friendly vehicle drives the driving motor using a voltage of a main battery (e.g., high voltage battery) and drives an electric load using a voltage of an auxiliary battery (e.g., low voltage battery). The electric load includes electric or electronic apparatuses using the voltage of the auxiliary battery, such as a head lamp, an air conditioner, a wiper, and the like. To convert a high voltage supplied from the main battery into a low voltage and supply the low voltage as an operation voltage to the electric load using the low voltage, a low voltage DC-DC converter (LDC) is disposed between the main battery and the auxiliary battery.

The environmental-friendly vehicle according to the related art adjusts an output voltage of the LDC based on a current driving mode and a state of charge (SOC) of the auxiliary battery to charge or discharge of the auxiliary battery. According to a method of adjusting (e.g., controllering) the output voltage of the LDC according to the related art, the auxiliary battery may be efficiently charged or discharged at a current time. However, since the method of controlling the output voltage of the LDC according to the related art does not completely reflect conditions of a road (e.g., a change in a gradient of the road, a change in a curvature radius of the road, and the like), it is inefficient in consideration of an entire driving section. For example, when entering a downhill and, when the SOC of the auxiliary battery is high, a chargeable SOC is insufficient, thus wasting regenerative braking energy.

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus of controlling an output voltage of a direct current (DC) converter for a vehicle including a driving motor having advantages of determining the output voltage of the DC converter by calculating an expected state of charge (SOC) of an auxiliary battery at an event point.

An exemplary embodiment of the present invention provides a method of controlling an output voltage of a DC converter for a vehicle including a driving motor, that may include: determining whether an event point is present on a driving route; calculating a distance from a current position of the vehicle to the event point when the event point is present on the driving route; calculating an expected arrival time that the vehicle may arrive at the event point based on the distance from the current position to the event point and an effective vehicle speed; calculating an expected SOC of an auxiliary battery at the event point based on the expected arrival time, a current temperature of the auxiliary battery, and a current SOC of the auxiliary battery; calculating an SOC difference value between the current SOC of the auxiliary battery and the expected SOC of the auxiliary battery; and determining the output voltage of the DC converter based on the SOC difference value.

The event point may include an acceleration event point and a deceleration event point, and the acceleration event point and the deceleration event point may be set based on a gradient of a road, a curvature radius of the road, and a traffic vehicle speed. The effective vehicle speed may be an average vehicle speed for the previous predetermined time of the vehicle. In the calculation of the expected SOC of the auxiliary battery at the event point, the expected SOC of the auxiliary battery may be calculated using a map table in which expected SOCs of the auxiliary battery that correspond to the expected arrival time, the current temperature of the auxiliary battery, and the current SOC of the auxiliary battery may be stored.

In the determination of the output voltage of the DC converter based on the SOC difference value, an output voltage range of the DC converter may be set to a first range to perform a discharging-oriented control for discharging the auxiliary battery, when the SOC difference value is a negative value. In addition, the output voltage range of the DC converter may be set to a second range to perform a charging-oriented control for charging the auxiliary battery, when the SOC difference value is a positive value.

The method may further include comparing the current SOC of the auxiliary battery with a controllable SOC, wherein the determination of the output voltage of the DC converter based on the SOC difference value may be performed when the current SOC of the auxiliary battery is greater than the controllable SOC. The method may further include determining the output voltage of the DC converter to be a maximum value when a main battery discharging control condition is satisfied.

Another exemplary embodiment of the present invention provides an apparatus of controlling an output voltage of a DC converter for a vehicle including a driving motor, that may include: a data detector configured to detect data for controlling the output voltage of the DC converter; and a controller configured to adjust the output voltage of the DC converter based on the data, wherein the controller may be configured to determine whether an event point is present on a driving route, calculate an expected SOC of an auxiliary battery at the event point, calculate an SOC difference value between a current SOC of the auxiliary battery and the expected SOC of the auxiliary battery, and determine the output voltage of the DC converter based on the SOC difference value.

The event point may include an acceleration event point and a deceleration event point. In particular, the acceleration event point and the deceleration event point may be set based on a gradient of a road, a curvature radius of the road, and a traffic vehicle speed. The controller may be configured to calculate a distance from a current position of the vehicle to the event point, calculate an expected arrival time when the vehicle may arrive (e.g., is expected to arrive or predicted to arrive) at the event point based on the distance from the current position to the event point and an effective vehicle speed, and calculate the expected SOC of the auxiliary battery at the event point based on the expected arrival time, a current temperature of the auxiliary battery, and the current SOC of the auxiliary battery.

The effective vehicle speed may be an average vehicle speed for the previous predetermined time of the vehicle. The controller may be configured to calculate the expected SOC of the auxiliary battery using a map table in which expected SOCs of the auxiliary battery that corresponds to the expected arrival time, the current temperature of the auxiliary battery, and the current SOC of the auxiliary battery may be stored. The controller may be configured to set an output voltage range of the DC converter to a first range to perform a discharging-oriented control for discharging the auxiliary battery, when the SOC difference value is a negative value.

The controller may be configured to set the output voltage range of the DC converter to a second range to perform a charging-oriented control for charging the auxiliary battery, when the SOC difference value is a positive value. The controller may further be configured to determine the output voltage of the DC converter based on the SOC difference value when the current SOC of the auxiliary battery is greater than a controllable SOC. The controller may be configured to determine the output voltage of the DC converter to be a maximum value when a main battery discharging control condition is satisfied.

As described above, according to an exemplary embodiment of the present invention, the output voltage of the DC converter may be adjusted to efficiently charge or discharge the auxiliary battery in an entire driving section. The accumulated power amount of the DC converter in the entire driving section may be decreased to improve fuel efficiency. In addition, a change amount of the SOC of the auxiliary battery may be optimized to secure durability of the auxiliary battery.

BRIEF DESCRIPTION OF THE DRAWINGS

The above and other objects, features and advantages of the present disclosure will be more apparent from the following detailed description taken in conjunction with the accompanying drawings.

DESCRIPTION OF SYMBOLS

Figure 1:
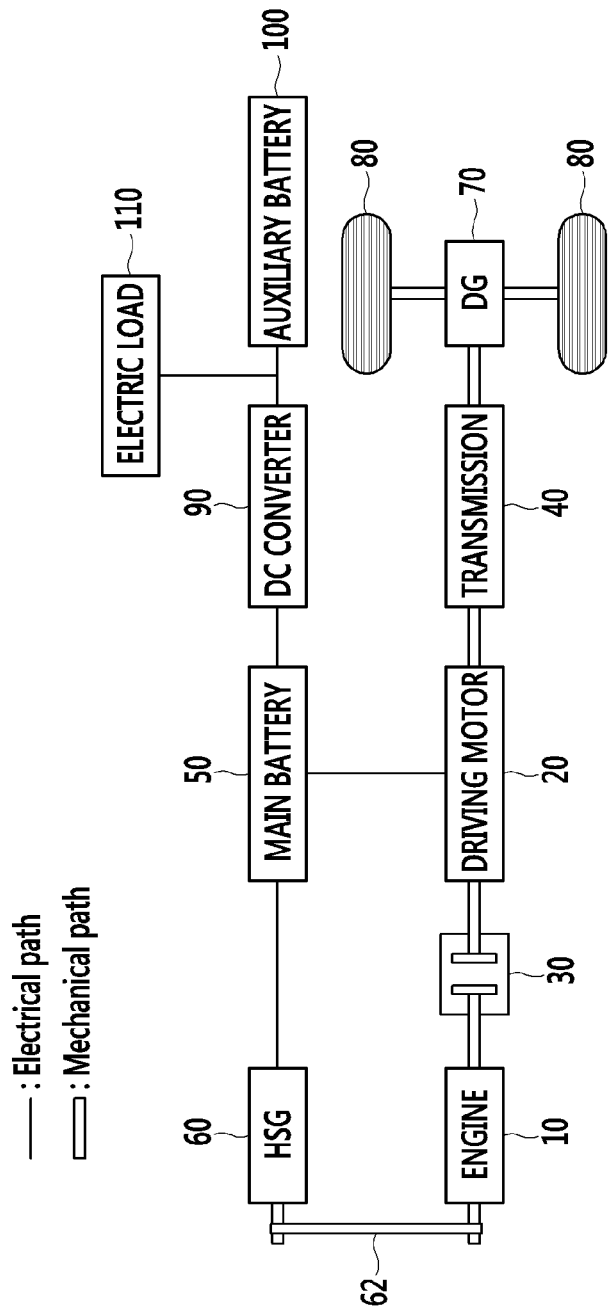
FIG. 1 is a block diagram showing a hybrid electric vehicle according to an exemplary embodiment of the present invention.

10: engine
20: driving motor
30: engine clutch
40: transmission
50: main battery
60: HSG
70: differential gear device
80: wheel
90: DC converter
100: auxiliary battery
110: electric load
120: controller
130: data detector

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described more fully with reference to the accompanying drawings so as to be easily practiced by those skilled in the art to which the present invention pertains. However, the present invention is not limited to exemplary embodiments described therein, but may also be embodied in other forms.

Portions unrelated to the description will be omitted to obviously describe the present invention, and like or similar components will be denoted by the same reference numerals throughout the present specification. In addition, since the respective components shown in the accompanying drawings are arbitrarily shown for convenience of explanation, the present invention is not necessarily limited to contents shown in the accompanying drawings.

In the present specification and claims, it is to be understood that a vehicle means a hybrid electric vehicle, a plug-in hybrid electric vehicle, an electric vehicle, or a fuel cell vehicle using power of a driving motor. Hereinafter, the hybrid electric vehicle will be mainly described, and since a technology of driving the plug-in hybrid electric vehicle, the electric vehicle, and the fuel cell vehicle by the driving motor is obvious to a person of ordinary skill in the art, a detailed description therefor will be omitted.

FIG. 1 is a block diagram showing a hybrid electric vehicle according to an exemplary embodiment of the present invention. As shown in FIG. 1, the hybrid electric vehicle according to an exemplary embodiment of the present invention may include an engine 10, a driving motor 20, an engine clutch 30 that selectively connects the engine 10 and the driving motor 20, a transmission 40, a main battery 50, a hybrid starter & generator (HSG) 60, a differential gear device 70, wheels 80, a direct current (DC) converter 90, an auxiliary battery 100, an electric load 110, and a controller 120 (see FIG. 2). The controller 120 may be configured to operate the various components of the hybrid electric vehicle.

The hybrid electric vehicle may be driven in various driving modes such as an electric vehicle (EV) mode in which the power of the driving motor 20 is used; a hybrid electric vehicle (HEV) mode in which power of the engine 10 is used as main power and power of the driving motor 20 is used as auxiliary power; a regenerative braking mode in which braking and inertial energy is recovered through electric power generation of the driving motor 20 during braking of the vehicle or during driving of the vehicle by inertia to be charged in the main battery 50, or the like, by engaging or releasing the engine clutch 30 based on an acceleration or deceleration intention, a vehicle speed, a state of charge (SOC) of the main battery 50, and the like.

The engine 10, which combusts a fuel to generate power, may be various engines such as a gasoline engine, a diesel engine, a liquid propane injection (LPI) engine, and the like. Describing power transfer of the hybrid electric vehicle, power generated in the engine 10 and/or the driving motor 20 may be selectively transferred to an input shaft of the transmission 40, and power output from an output shaft of the transmission 40 may be transferred to an axle via the differential gear device 70. The axle may be configured to rotate the wheels 80 to drive the hybrid electric vehicle by the power generated in the engine 10 and/or the driving motor 20.

The main battery 50 may be configured to supply electricity to the driving motor 20 in the EV mode and the HEV mode, and may be charged by electricity recovered through the driving motor 20 in the regenerative braking mode. A high voltage may be stored in the main battery 50. The HSG 60 may be configured to start the engine 10 or generate power by an output of the engine 10. The HSG may be called an integrated starter & generator (ISG). The engine 10 and the HSG 60 may be connected by a belt 62.

Further, the DC converter 90 may be disposed between the main battery 50 and the auxiliary battery 100. The DC converter 90 may be a low voltage DC-DC converter (LDC) configured to convert a high voltage supplied from the main battery 50 into a low voltage and supply the low voltage as an operation voltage to the electric load 110. The auxiliary battery 100 may be configured to supply electricity to the electric load 110, and may be charged or discharged based on an output voltage of the DC converter 90. The electric load 110 may include a head lamp, an air conditioner, a wiper, a ventilating sheet, and the like. The controller 120 may be configured to adjust output torques of the engine 10 and the driving motor 20 based on a driving condition of the hybrid electric vehicle.

Figure 2:
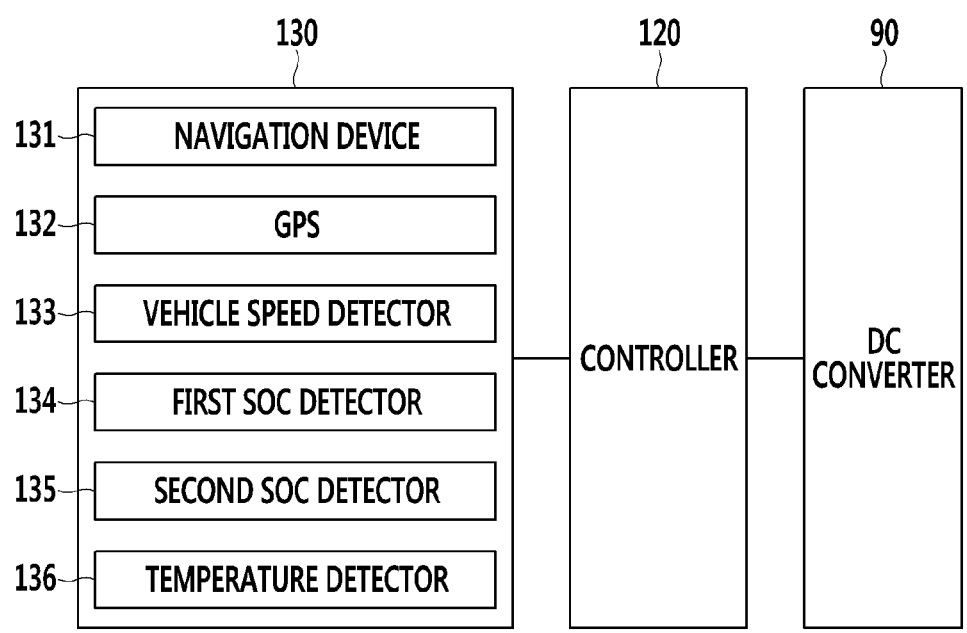
FIG. 2 is a block diagram showing an apparatus of controlling an output voltage of a direct current (DC) converter according to an exemplary embodiment of the present invention.

FIG. 2 is a block diagram showing an apparatus of controlling an output voltage of a DC converter according to an exemplary embodiment of the present invention. As shown in FIG. 2, the apparatus of controlling an output voltage of a DC converter according to an exemplary embodiment of the present invention may include a data detector 130 and a controller 120.

The data detector 130 may be configured to detect data for adjusting the output voltage of the DC converter 90, and the data detected by the data detector 130 may be transferred to the controller 120. The data detector 130 may include a navigation device 131, a global positioning system (GPS) 132, a vehicle speed detector 133, a first SOC detector 134, a second SOC detector 135, and a temperature detector 136.

In particular, the navigation device 131 is a device that informs a driver of a route toward a destination. The navigation device 131 may include an input and output unit configured to input and output information regarding route guidance, a current position detector configured to detect information regarding a current position of the vehicle, a memory storing map data required for calculating a route and data required for guidance therein, a controller configured to execute route search or route guidance, and the like.

However, in an exemplary embodiment of the present invention, it is sufficient for the navigation device 131 to provide information regarding a gradient of a road and a curvature radius of the road included in three-dimensional (3D) map data and a traffic vehicle speed included in transport protocol expert group (TPEG) data to the controller 120. Therefore, in the present specification and claims, it may be understood that the navigation device 131 may include any device that may provide information regarding the gradient of the road, the curvature radius of the road, and traffic vehicle speed to the controller 120.

The GPS 132 may be configured to a signal transferred from a GPS satellite and transfer a signal that corresponds thereto to the navigation device 131. The navigation device 131 may be configured to calculate the current position of the vehicle based on the signal. The vehicle speed detector 133 may be configured to detect a vehicle speed and transfer a signal that corresponds thereto to the controller 120. The first SOC detector 134 may be configured to detect an SOC of the main battery 50 and transfer a signal that corresponds thereto to the controller 120. The second SOC detector 135 may be configured to detect an SOC of the auxiliary battery 100 and transfer a signal that corresponds thereto to the controller 120.

The temperature detector 136 may be configured to detect a temperature of the auxiliary battery 100 and transfer a signal that corresponds thereto to the controller 120. The second SOC detector 135 and the temperature detector 136 may be implemented by an intelligent battery sensor (IBS). The controller 120 may be implemented by at least one microprocessor executed by a predetermined program that may include a series of commands for performing each step included in a method of controlling (e.g., adjusting) an output voltage of a DC converter according to an exemplary embodiment of the present invention to be described below.

Figure 3:
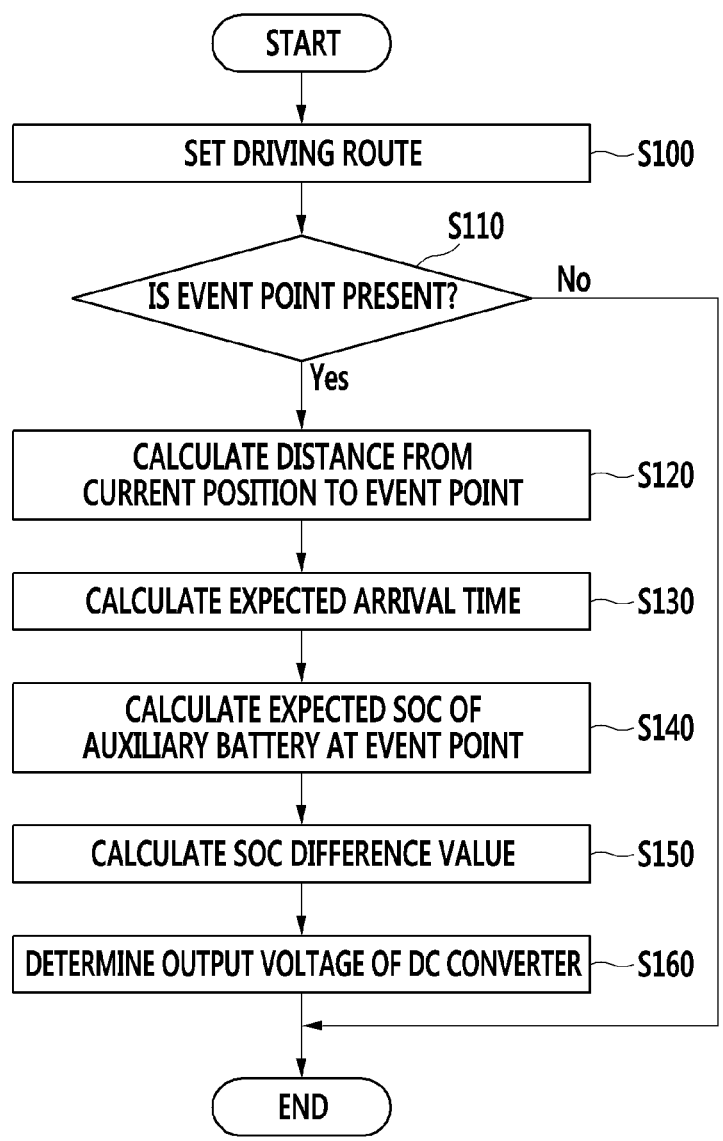
FIG. 3 is a flow chart showing a method of controlling an output voltage of a DC converter according to an exemplary embodiment of the present invention.
Figure 4:
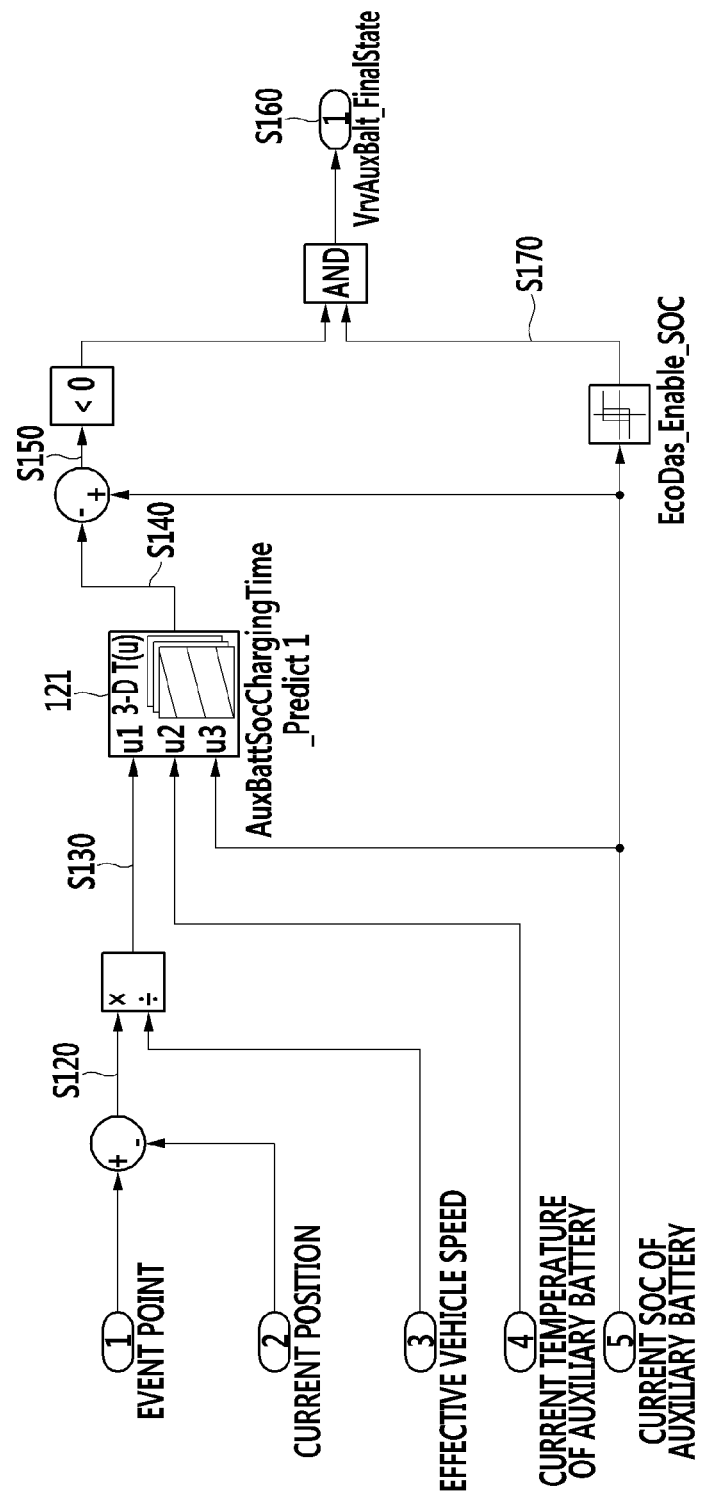
FIG. 4 is a logic configuration diagram of the method of controlling an output voltage of a DC converter according to an exemplary embodiment of the present invention.
Figure 5:
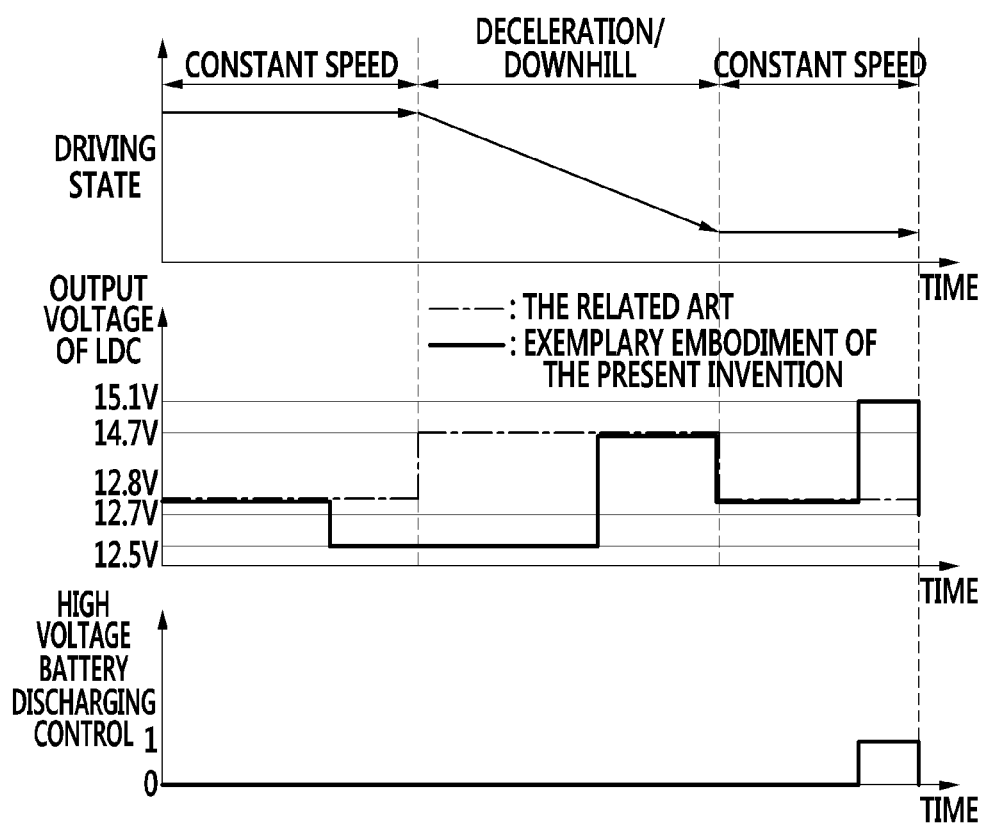
FIG. 5 is a graph for describing the method of controlling an output voltage of a DC converter according to an exemplary embodiment of the present invention.

Hereinafter, a method of controlling an output voltage of a DC converter according to an exemplary embodiment of the present invention will be described in detail with reference to FIGS. 3 to 5. Referring to FIGS. 3 to 5, the method of controlling an output voltage of a DC converter 90 according to an exemplary embodiment of the present invention may begin with setting a driving route from a current position of the vehicle to a destination (S100). When a user (e.g., a driver) selects the destination via the navigation device 131, the navigation device 131 may be configured to calculate the driving route from the current position of the vehicle toward the destination based on the three-dimensional (3D) map data. The navigation device 131 may be configured to transfer data regarding a gradient of a road and a curvature radius of the road on the driving route to the controller 120.

The controller 120 may be configured to determine whether an event point is present on the driving route (S110). The event point may include an acceleration event point and a deceleration event point, and the controller 120 may be configured to set the acceleration event point and the deceleration event point based on the gradient of the road, the curvature radius of the road, and the traffic vehicle speed. For example, when the vehicle turns right at an intersection on the driving route, it may be expected that the driver will perform deceleration by depressing a brake pedal (e.g., applying less pressure onto the pedal) before the vehicle enters the intersection. Therefore, the intersection may be set to the deceleration event point. In addition, when the vehicle is driven downhill on the driving route, it may be expected that the driver will perform deceleration by depressing the brake pedal before the vehicle enters the downhill road. Therefore, a downhill entering point may be set to the deceleration event point. When the vehicle is driven uphill on the driving route, it may be expected that the driver will perform acceleration by depressing an acceleration pedal before the vehicle enters the uphill road. Therefore, an uphill entering point may be set to the acceleration event point.

When the event point is not present on the driving route in step S110, the controller 120 may terminate the method of controlling an output voltage of a DC converter 90 according to an exemplary embodiment of the present invention. When the event point is present on the driving route, the controller 120 may be configured to calculate a distance from the current position of the vehicle to the event point (S120).

Furthermore, the controller 120 may be configured to calculate an expected arrival time when the vehicle may arrive at the event point based on the distance from the current position of the vehicle to the event point and an effective vehicle speed (S130). The effective vehicle speed may be an average vehicle speed for the previous (e.g., past) predetermined time of the vehicle. In addition, the controller 120 may be configured to calculate the effective vehicle speed in further consideration of the traffic vehicle speed. The controller 120 may be configured to calculate the expected arrival time by dividing the distance by the expected arrival time.

In addition, the controller 120 may be configured calculate an expected SOC of the auxiliary battery 100 at the event point using a map table 121 based on the expected arrival time, a current temperature of the auxiliary battery 100, and a current SOC of the auxiliary battery 100 (S140). Expected SOCs of the auxiliary battery 100 that correspond to the expected arrival time, the current temperature of the auxiliary battery 100, and the current SOC of the auxiliary battery 100 may be stored in the map table 121. The controller 120 may be configured to calculate an SOC difference value between the current SOC of the auxiliary battery 100 and the expected SOC of the auxiliary battery 100 (S150). In particular, the controller 120 may be configured to calculate the SOC difference value by subtracting the expected SOC of the auxiliary battery 100 from the current SOC of the auxiliary battery 100.

The controller 120 may be configured to determine the output voltage of the DC converter 90 based on the SOC difference value (S160). In particular, the controller 120 may be configured to set an output voltage range of the DC converter 90 based on the SOC difference value to perform a discharging-oriented control and a charging-oriented control. For example, when the SOC difference value is a negative value, the controller 120 may be configured to set the output voltage range of the DC converter 90 to a first range (e.g., about 12.5 V to 12.8 V) to discharge the auxiliary battery 100. When the SOC difference value is a positive value, the controller 120 may be configured to set the output voltage range of the DC converter 90 to a second range (e.g., about 14.5 V to 15.1 V) to charge the auxiliary battery 100.

Meanwhile, the controller 120 may be configured to compare the current SOC of the auxiliary battery 100 with a controllable SOC (S170). The controllable SOC, which is an SOC of the auxiliary battery 100 on which the method of controlling an output voltage of a DC converter 90 according to an exemplary embodiment of the present invention is performed, may be set to a value determined by a person of ordinary skill in the art based on a specification of the auxiliary battery 100.

When the current SOC of the auxiliary battery 100 is greater than the controllable SOC and the SOC difference value is the negative value, the controller 120 may be configured to determine the output voltage of the DC converter 90 using the map table in which output voltages of the DC converter 90 that corresponds to the SOC difference values are stored. In particular, the output voltage range of the DC converter 90 may be set within the first range. Therefore, the auxiliary battery 100 may be discharged.

When the current SOC of the auxiliary battery 100 is greater than the controllable SOC and the SOC difference value is the positive value, the controller 120 may be configured to determine the output voltage of the DC converter 90 using the map table in which output voltages of the DC converter 90 that corresponds to the SOC difference values are stored. In particular, the output voltage range of the DC converter 90 may be set within the second range. Therefore, the auxiliary battery 100 may be charged.

Meanwhile, as shown in FIG. 5, the controller 120 may be configured to determine the output voltage of the DC converter 90 to be a maximum value (e.g., about 15.1 V) when a main battery discharging control condition is satisfied. The main battery discharging control condition may be satisfied when the SOC of the main battery 50 is a predetermined SOC or greater. Since it may be difficult to discharge the main battery 50 by a desired change amount of an SOC at a desired time due to characteristics of the main battery 50, when the main battery discharging control condition is satisfied, the output voltage of the DC converter 90 may be determined to be the maximum value, thereby making it possible to increase a charged amount of the auxiliary battery 100 and a power consumption amount of the electric load 110. Therefore, the auxiliary battery 100 may be charged, and the main battery 50 may be discharged by the desired change amount of the SOC.

Figure 6:
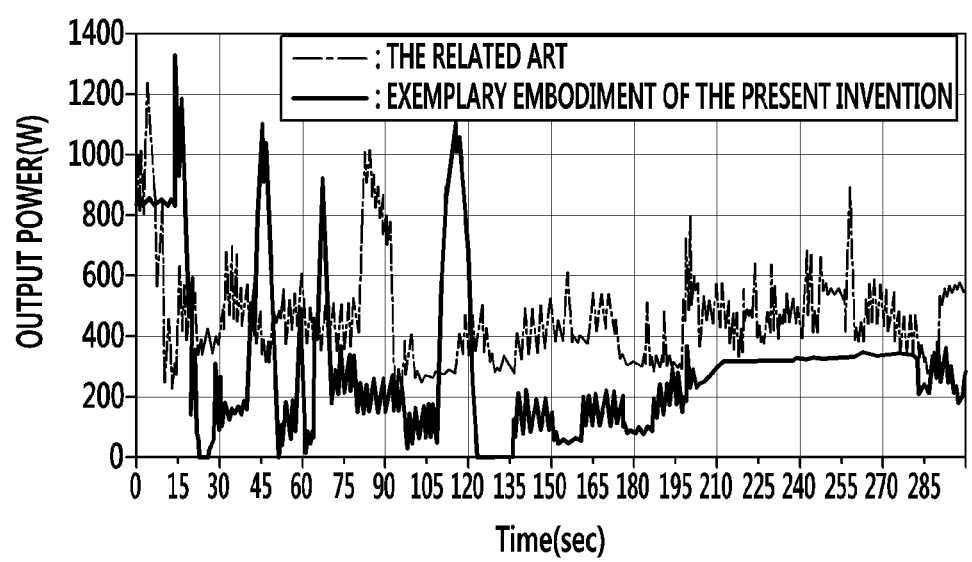
FIG. 6 is a graph for comparing an output power amount of the DC converter according to an exemplary embodiment of the present invention and an output power amount of a DC converter according to the related art with each other.
Figure 7:
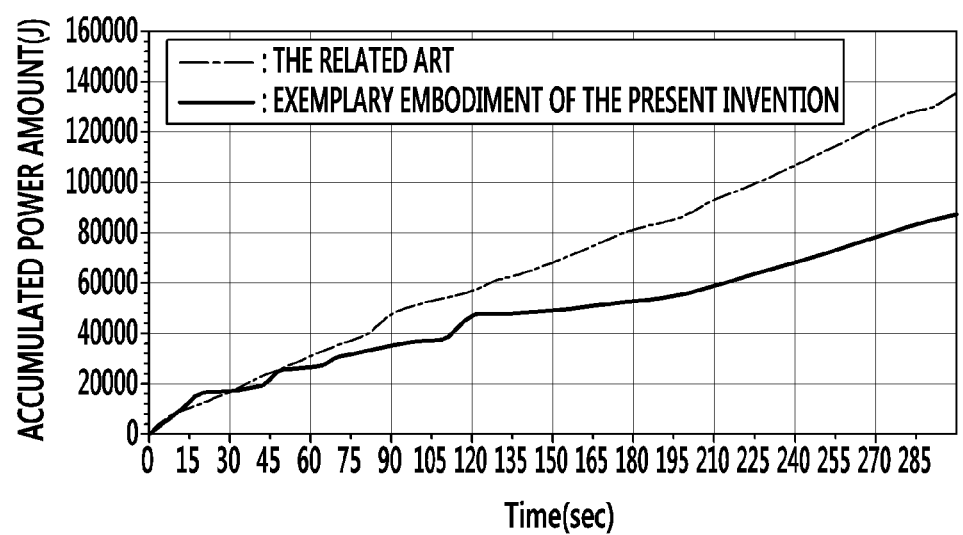
FIG. 7 is a graph comparing an accumulated power amount of the DC converter according to an exemplary embodiment of the present invention and an accumulated power amount of a DC converter according to the related art with each other.

FIG. 6 is a graph for comparing an output power amount of the DC converter according to an exemplary embodiment of the present invention and an output power amount of a DC converter according to the related art with each other, and FIG. 7 is a graph for comparing an accumulated power amount of the DC converter according to an exemplary embodiment of the present invention and an accumulated power amount of a DC converter according to the related art with each other.

As shown in FIGS. 6 and 7, as described above, according to an exemplary embodiment of the present invention, the output voltage of the DC converter 90 may be adjusted to efficiently charge or discharge the auxiliary battery 100 in an entire driving section. The accumulated power amount of the DC converter in the entire driving section may be decreased to improve fuel efficiency. In addition, a change amount of the SOC of the auxiliary battery 100 may be optimized, thereby making it possible to secure durability of the auxiliary battery 100.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of controlling an output voltage of a direct current (DC) converter for a vehicle including a driving motor, the method comprising:
   determining, by a controller, whether an event point is present on a driving route;
   calculating, by the controller, a distance from a current position of the vehicle to the event point when the event point is present on the driving route;
   calculating, by the controller, an expected arrival time when the vehicle is predicted to arrive at the event point based on the distance from the current position to the event point and an effective vehicle speed;
   calculating, by the controller, an expected state of charge (SOC) of an auxiliary battery at the event point based on the expected arrival time, a current temperature of the auxiliary battery, and a current SOC of the auxiliary battery;
   calculating, by the controller, an SOC difference value between the current SOC of the auxiliary battery and the expected SOC of the auxiliary battery; and
   determining, by the controller, the output voltage of the DC converter based on the SOC difference value.

2. The method of claim 1, wherein the event point includes an acceleration event point and a deceleration event point, and the acceleration event point and the deceleration event point are set based on a gradient of a road, a curvature radius of the road, and a traffic vehicle speed.

3. The method of claim 1, wherein the effective vehicle speed is an average vehicle speed for a previous predetermined time of the vehicle.

4. The method of claim 1, wherein in the calculation of the expected SOC of the auxiliary battery at the event point, the expected SOC of the auxiliary battery is calculated using a map table in which expected state of charges of the auxiliary battery that correspond to the expected arrival time, the current temperature of the auxiliary battery, and the current SOC of the auxiliary battery are stored.

5. The method of claim 1, wherein in the determination of the output voltage of the DC converter based on the SOC difference value, an output voltage range of the DC converter is set to a first range to discharge the auxiliary battery, when the SOC difference value is a negative value.

6. The method of claim 5, wherein in the determination of the output voltage of the DC converter based on the SOC difference value, the output voltage range of the DC converter is set to a second range to charge the auxiliary battery, when the SOC difference value is a positive value.

7. The method of claim 1, further comprising:
   comparing, by the controller, the current SOC of the auxiliary battery with a controllable SOC,
   wherein the determination of the output voltage of the DC converter based on the SOC difference value is performed when the current SOC of the auxiliary battery is greater than the controllable SOC.

8. The method of claim 1, further comprising:
   determining the output voltage of the DC converter to be a maximum value when a main battery discharging control condition is satisfied.

9. The method of claim 8, wherein the main battery discharging control condition is satisfied when a current SOC of a main battery is a predetermined SOC or greater.

10. An apparatus of controlling an output voltage of a direct current (DC) converter for a vehicle including a driving motor, the apparatus comprising:
    a data detector configured to detect data for adjusting the output voltage of the DC converter; and
    a controller configured to adjust the output voltage of the DC converter based on the detected data,
    wherein the controller is configured to determine whether an event point is present on a driving route, calculate an expected state of charge (SOC) of an auxiliary battery at the event point, calculate an SOC difference value between a current SOC of the auxiliary battery and the expected SOC of the auxiliary battery, and determine the output voltage of the DC converter based on the SOC difference value.

11. The apparatus of claim 10, wherein the event point includes an acceleration event point and a deceleration event point, and the acceleration event point and the deceleration event point are set based on a gradient of a road, a curvature radius of the road, and a traffic vehicle speed.

12. The apparatus of claim 10, wherein the controller is further configured to:
   calculate a distance from a current position of the vehicle to the event point;
   calculate an expected arrival time when the vehicle is predicted to arrive at the event point based on the distance from the current position of the vehicle to the event point and an effective vehicle speed; and
   calculate the expected SOC of the auxiliary battery at the event point based on the expected arrival time, a current temperature of the auxiliary battery, and the current SOC of the auxiliary battery.

13. The apparatus of claim 12, wherein the effective vehicle speed is an average vehicle speed for a previous predetermined time of the vehicle.

14. The apparatus of claim 12, wherein the controller is configured to calculate the expected SOC of the auxiliary battery using a map table in which expected state of charges of the auxiliary battery that correspond to the expected arrival time, the current temperature of the auxiliary battery, and the current SOC of the auxiliary battery are stored.

15. The apparatus of claim 12, wherein the controller is configured to e-set an output voltage range of the DC converter to a first range to discharge the auxiliary battery, when the SOC difference value is a negative value.

16. The apparatus of claim 15, wherein the controller is configured to set the output voltage range of the DC converter to a second range to charge the auxiliary battery, when the SOC difference value is a positive value.

17. The apparatus of claim 10, wherein the controller is configured to determine the output voltage of the DC converter based on the SOC difference value when the current SOC of the auxiliary battery is greater than a controllable SOC.

18. The apparatus of claim 10, wherein the controller is configured to determine the output voltage of the DC converter to be a maximum value when a main battery discharging control condition is satisfied.

19. The apparatus of claim 18, wherein the main battery discharging condition is satisfied when a current SOC of a main battery is equal to or greater than a predetermined SOC.

\* \* \* \* \*